(12) United States Patent
Muller et al.

(10) Patent No.: US 12,340,512 B2
(45) Date of Patent: Jun. 24, 2025

(54) METHODS AND SYSTEMS FOR EARLY DETECTION AND LOCALIZATION OF A LESION

(71) Applicant: GE Precision Healthcare LLC, Wauwatosa, WI (US)

(72) Inventors: Serge Muller, Yvelines (FR); Clement Jailin, Hauts de Seine (FR)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 379 days.

(21) Appl. No.: 17/808,448

(22) Filed: Jun. 23, 2022

(65) Prior Publication Data

US 2023/0041804 A1    Feb. 9, 2023

Related U.S. Application Data

(60) Provisional application No. 63/203,920, filed on Aug. 4, 2021.

(51) Int. Cl.
| | |
|---|---|
| *G06T 7/00* | (2017.01) |
| *G06T 3/18* | (2024.01) |
| *G06T 7/30* | (2017.01) |
| *G06V 10/40* | (2022.01) |
| *G06V 10/75* | (2022.01) |

(Continued)

(52) U.S. Cl.
CPC ............. *G06T 7/0016* (2013.01); *G06T 3/18* (2024.01); *G06T 7/30* (2017.01); *G06V 10/40* (2022.01); *G06V 10/759* (2022.01); *G06V 10/764* (2022.01); *G06V 10/774* (2022.01); *G06V 10/82* (2022.01); *G06T 2207/10116* (2013.01); *G06T 2207/20081* (2013.01);

(Continued)

(58) Field of Classification Search
CPC .......... G06T 7/0016; G06T 3/18; G06T 7/30; G06T 2207/10116; G06T 2207/20081; G06T 2207/20084; G06T 2207/30068; G06T 2207/30096; G06T 7/33; G06T 7/00; G06T 2210/41; G06V 10/40; G06V 10/255; G06V 10/759; G06V 10/764; G06V 10/774; G06V 10/82; G06V 2201/03; G06V 20/698; G06V 2201/031; G06V 10/25
See application file for complete search history.

(56) References Cited

U.S. PATENT DOCUMENTS

| | | | |
|---|---|---|---|
| 8,175,351 B2 | 5/2012 | Collins et al. | |
| 9,710,695 B2 * | 7/2017 | Xu | ........................ G06F 18/2414 |

(Continued)

FOREIGN PATENT DOCUMENTS

| | | | | |
|---|---|---|---|---|
| WO | WO-2014206881 A1 * | 12/2014 | ........... | G06T 7/0012 |
| WO | WO-2019238804 A1 * | 12/2019 | ........... | G06F 18/214 |

*Primary Examiner* — Guillermo M Rivera-Martinez
(74) *Attorney, Agent, or Firm* — McCoy Russell LLP

(57) ABSTRACT

Various methods and systems are provided for identifying future occurrences of lesions in a patient. In one example, a method includes feeding first images collected from one or more patients prior to appearance of lesions and second images collected from the one or more patients after appearance of the lesions to a processor to train a model to predict a location of a future lesion. The method further includes inputting third images collected from a new patient to the processor to infer regions for future lesions, and displaying the inferred regions in a probability map at a display unit to indicate areas of increased likelihood of lesion occurrence.

17 Claims, 11 Drawing Sheets

(51) Int. Cl.
    *G06V 10/764*      (2022.01)
    *G06V 10/774*      (2022.01)
    *G06V 10/82*        (2022.01)

(52) U.S. Cl.
    CPC .............. *G06T 2207/20084* (2013.01); *G06T 2207/30068* (2013.01); *G06T 2207/30096* (2013.01); *G06V 2201/03* (2022.01)

(56) References Cited

U.S. PATENT DOCUMENTS

| | | | |
|---|---|---|---|
| 9,943,280 B2 * | 4/2018 | Wang | A61B 6/5217 |
| 2016/0104280 A1 * | 4/2016 | Buelow | G06T 7/344 |
| | | | 382/131 |
| 2019/0311475 A1 * | 10/2019 | Hosoi | G06N 3/08 |
| 2020/0085382 A1 * | 3/2020 | Taerum | A61B 5/7264 |
| 2020/0184252 A1 * | 6/2020 | Syeda-Mahmood | G06V 10/26 |
| 2020/0380675 A1 * | 12/2020 | Golden | G06T 7/194 |
| 2021/0034905 A1 * | 2/2021 | Lee | G06N 3/08 |
| 2021/0248736 A1 * | 8/2021 | Kamen | G06F 18/214 |
| 2024/0071621 A1 * | 2/2024 | Kim | G16H 30/40 |

* cited by examiner

METHODS AND SYSTEMS FOR EARLY DETECTION AND LOCALIZATION OF A LESION

CROSS REFERENCE TO RELATED APPLICATIONS

The present application claims priority to U.S. Provisional Application No. 63/203,920, and filed on Aug. 4, 2021. The entire contents of the above-listed applications are hereby incorporated by reference for all purposes.

FIELD

Embodiments of the subject matter disclosed herein relate to radiological imaging, and more particularly to detection and localization of a lesion in images prior to visual identification by a radiologist.

BACKGROUND

In the field of oncology, radiological imaging (e.g., X-ray, ultrasound, MRI, etc.) is used to identify lesions, or areas of abnormal tissue, which may include tumors. A lesion may be benign (e.g., non-cancerous) or malignant (e.g., cancerous). Often, findings of lesions on radiological images become visible years after lesion growth has progressed in a patient's body. With respect to radiological imaging and cancer screening, this may lead to development of interval lesions or cancer, where detection/presentation of the lesions and/or cancer is delayed by a time period, such as twelve months or longer, following an imaging event for which imaging results indicated a non-cancerous tissue state. In some examples, more frequent patient exams and/or monitoring of the patient may enable earlier detection of the lesions. Often, the greater the delay in detecting growing lesions, the more intense a corresponding treatment may be in order to eradicate the lesion, which cause further health issues and discomfort to the patient. Additionally, a probability of metastasis may increase with lesion growth, forcing application of treatments with greater side effects to address metastasized lesions.

A method is therefore desired to enable detection of lesions or potential formation of lesions prior to visual detection in radiological images by a physician or radiologist, in contrast to conventional practice where detection of lesions only occurs after the lesions become sufficiently large to be visible. For example, analysis of patient images and patient data to identify areas in images associated with a high likelihood of lesion presence may enable early identification of potential lesions in a patient, prior to the lesion becoming visible on radiological images. Additionally, if a lesion can be localized prior to its appearance, clinicians may be able to schedule personalized surveillance and care of the patient and apply more mild treatment strategies.

BRIEF DESCRIPTION

In one embodiment, a method for identifying an occurrence of lesions in a patient comprises feeding first images collected from one or more patients prior to appearance of lesions and second images collected from the one or more patients after appearance of the lesions to a processor to train a model to predict a location of a future lesion, the model stored at a memory of the processor and configured to compare regions of interest (ROIs) in the first images to corresponding ROIs in the second images. The method also comprises inputting third images collected from a new patient to the processor to infer regions for future lesions according to the model and mapping the inferred regions to anatomical regions of the new patient, and displaying the inferred regions in a probability map at a display unit to indicate areas of increased likelihood of lesion occurrence. As a result, clinical findings may be predicted and/or identified early in development before harsh treatment strategies are demanded.

For example, a machine learning classifier or a deep neural network may be trained to build a model based on inputs such as image and data sets acquired at a time at which no lesion was identified on a patient, as well as image and data sets acquired at a later time with clinical findings detected by a radiologist corresponding to a proven lesion in the same patient. The model may be applied to new patient image and data sets to predict and localize a lesion, thereby outputting a map indicating a probability of future appearance of lesions in the images that may not be visible on the current images. In this way, lesions may be detected and localized earlier compared to conventional methods of relying on visual identification by a radiologist, thereby allowing patients to be monitored and/or treated during early stages of lesion growth.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

The present disclosure will be better understood from reading the following description of non-limiting embodiments, with reference to the attached drawings, wherein below.

DETAILED DESCRIPTION

The following description relates to various embodiments for systems and methods for detecting and localizing potential lesions in radiological images by training either a machine learning classifier or a deep neural network. A trainable model may thereby be built based on images and data acquired from at least one imaging event where no lesion was identified on a patient and from at least one imaging event where at least one lesion was identified in the same patient. The trainable model may be implemented to analyze images and data of a new patient to predict and localize a lesion, and may output a map indicating the probability of lesions appearing in future imaging that may not yet be visible in the current images.

Figure 1:
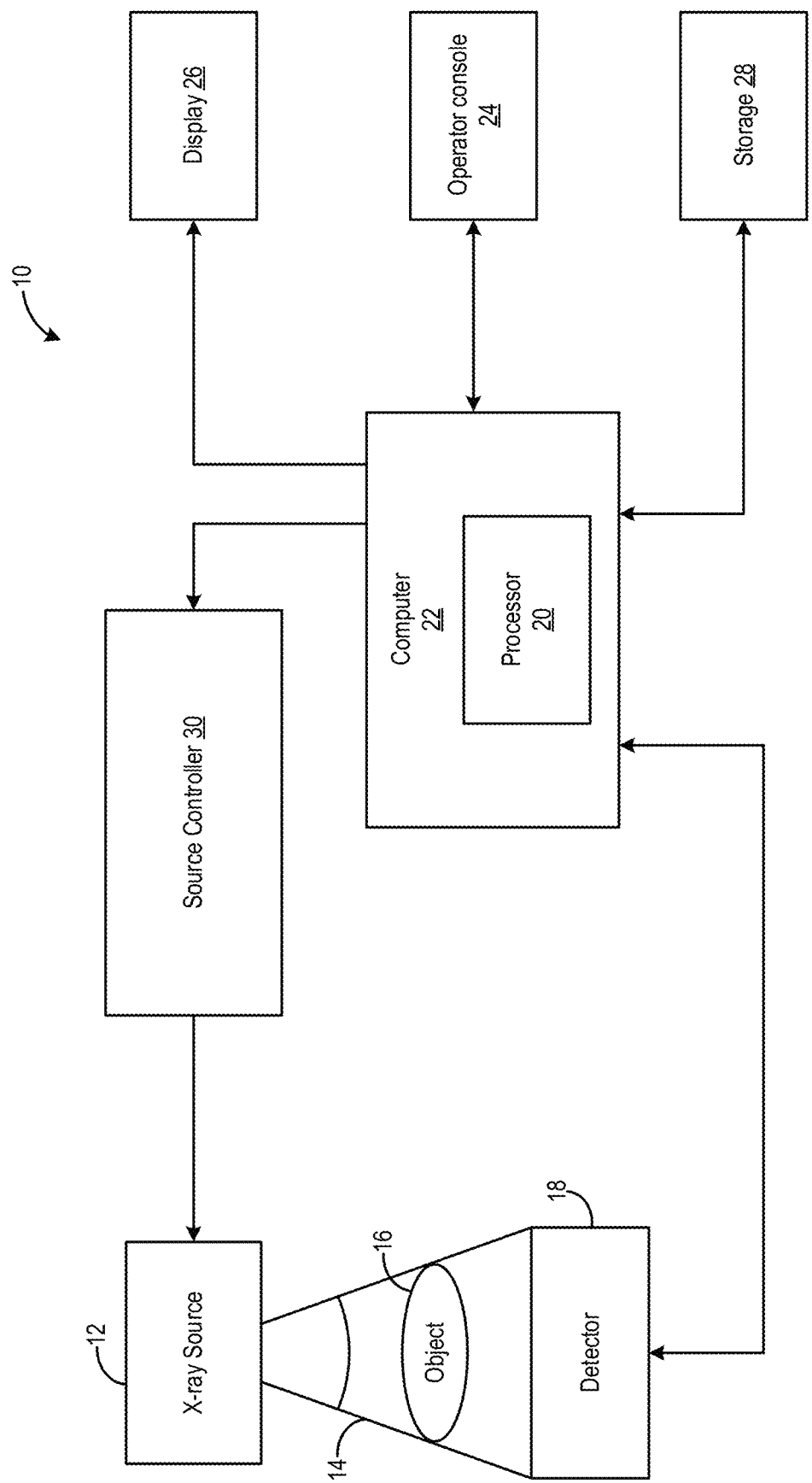
FIG. 1 is a block diagram of an X-ray imaging system according to an embodiment of the disclosure.
Figure 2:
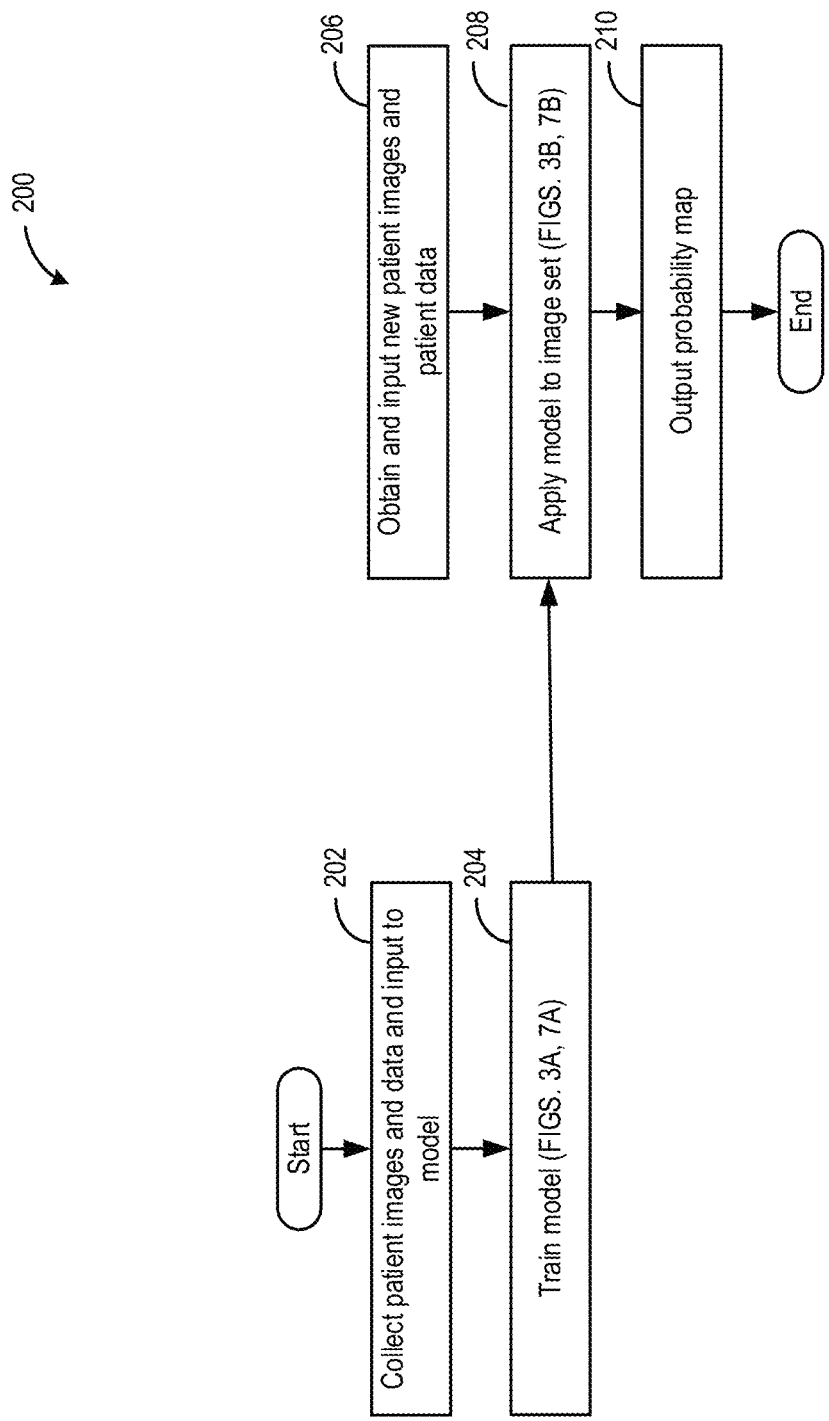
FIG. 2 shows a flow chart of an example method for detecting and localizing lesions.

The radiological images may be generated by a single or multiple imaging modalities, including X-ray, ultrasound, MRI, etc. The exemplary embodiment described herein describes the systems and methods in the context of X-ray mammography for breast imaging. A block diagram of an example X-ray imaging system is shown in FIG. 1. A method 200, as shown in FIG. 2, may be implemented at the X-ray imaging system of FIG. 1 to detect and localize lesions in patient images. Method 200 may include using a first set of patient data and images input into a system, such as the system of FIG. 1, to train a prediction and localization model, herein "model", in a learning phase to detect and localize potential lesions. Additionally, method 200 may include applying the model to a second set of patient data and images to detect and localize lesions during an inference phase of the method. The second set of patient data and images may belong to a same patient or a different patient with respect to a patient from which the first set of patient data and images are collected. The first set of data is used to train the model and may be statistically representative of a specific population, including the patient providing the second set of patient data and images used for the inference phase.

Figure 3A:
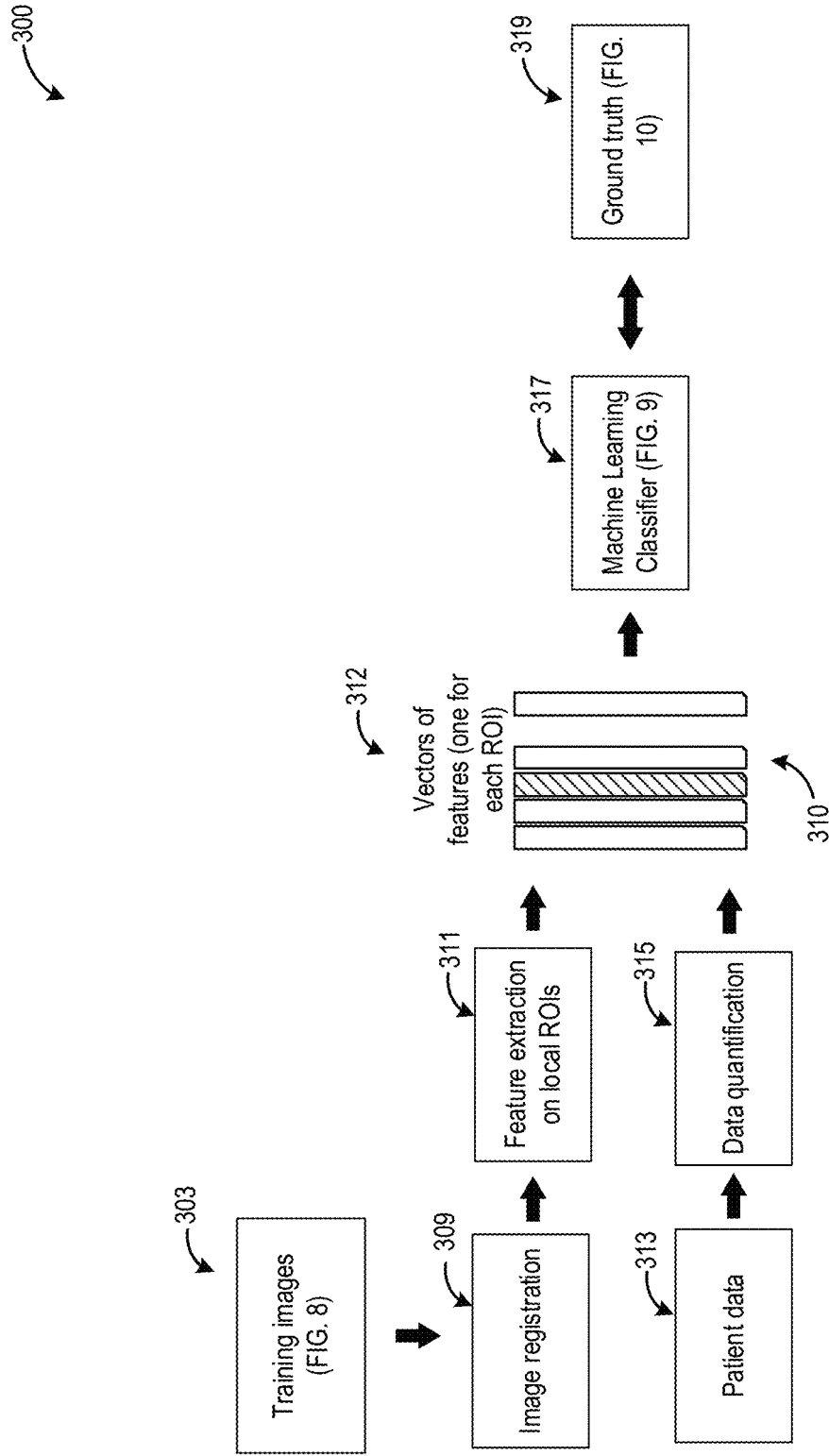
FIG. 3A shows a flow diagram for a learning phase of a first process for training and implementing a Machine Learning Classifier, in conjunction with the method of FIG. 2.
Figure 3B:
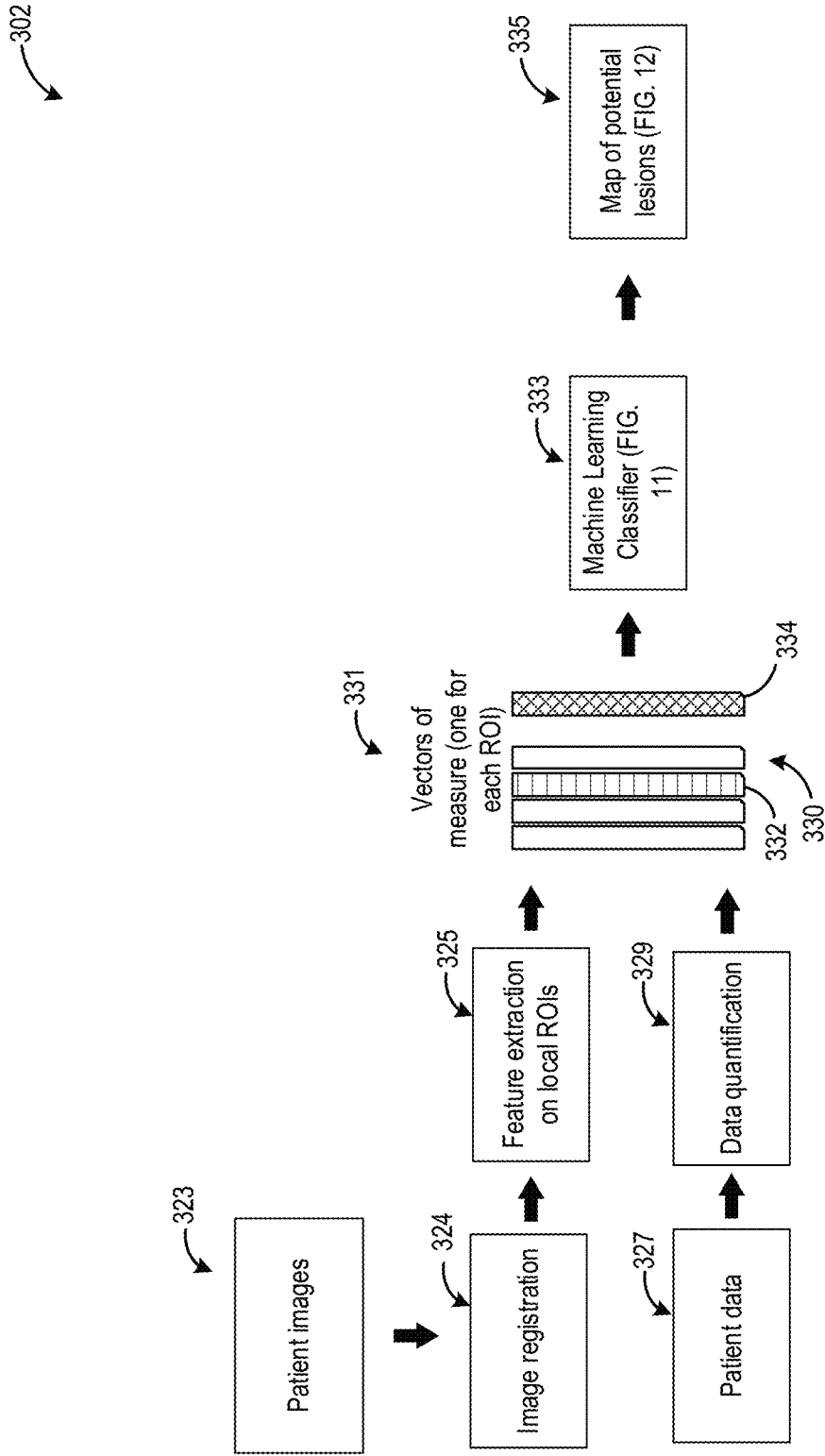
FIG. 3B shows a flow diagram for an inference phase of the first process.
Figure 4:
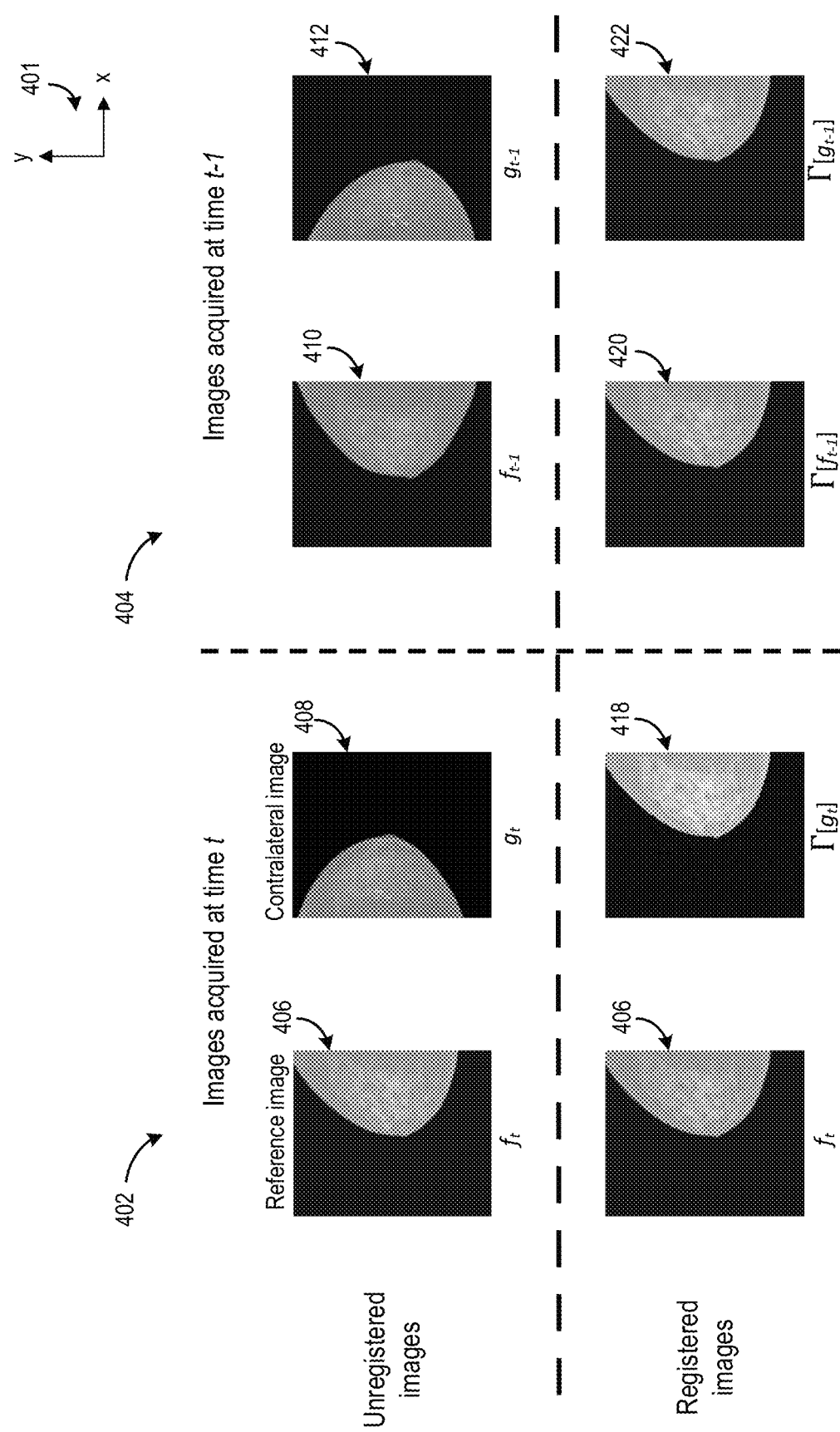
FIG. 4 shows an example comparison of registered and unregistered images, in conjunction with the first process of FIGS. 3A-3B.
Figure 5:
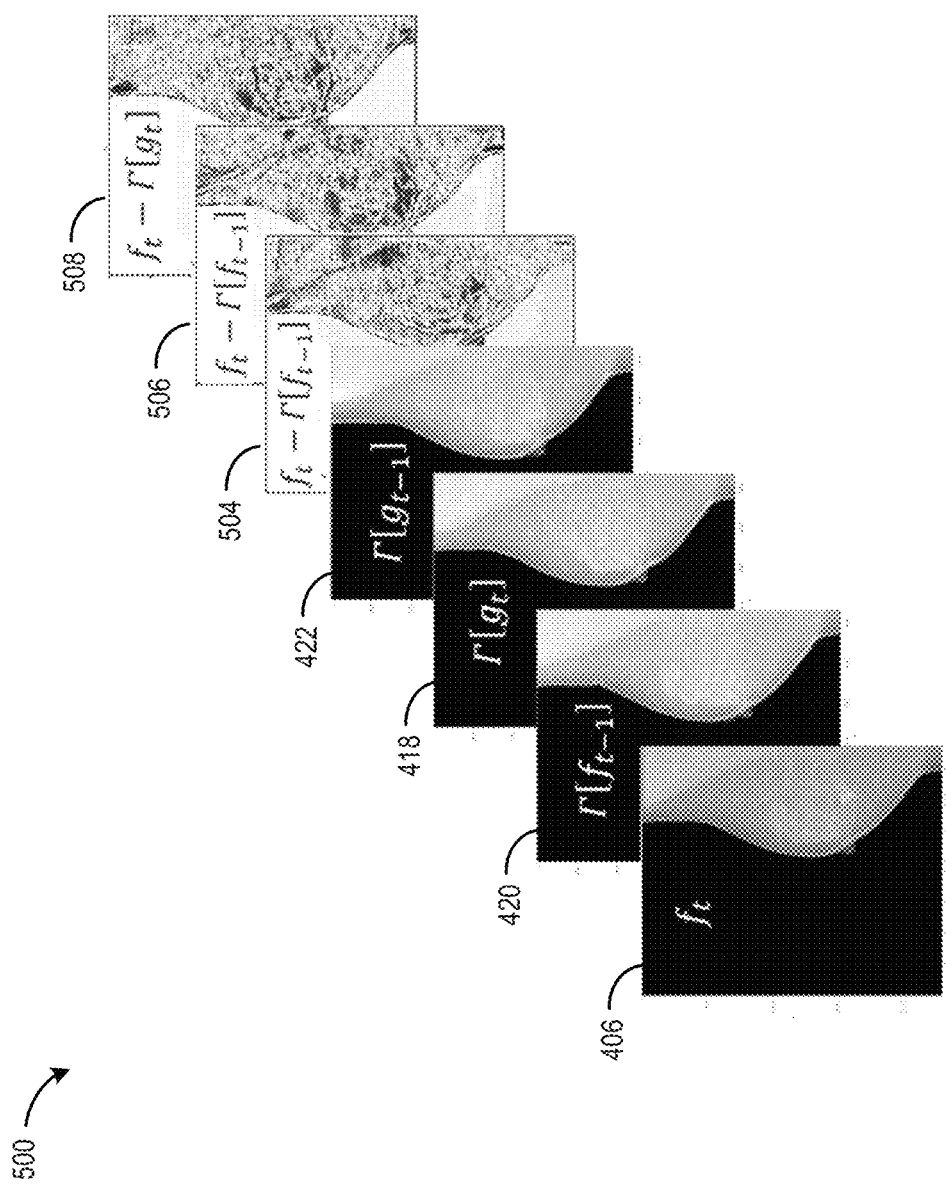
FIG. 5 shows an example image stack of registered images in conjunction with the first process of FIGS. 3A-3B.
Figure 6:
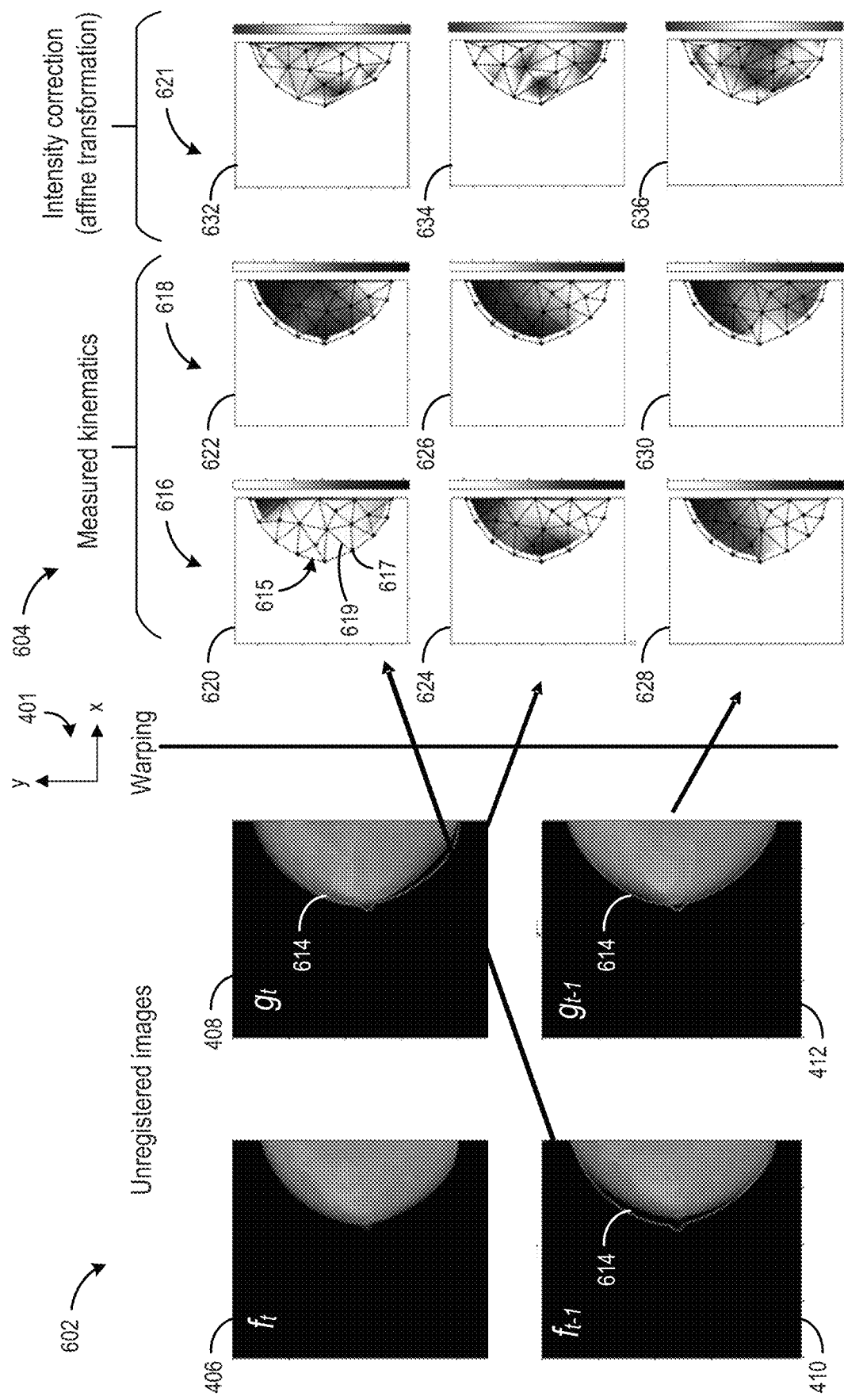
FIG. 6 shows an example mesh deformation of registered images, in conjunction with the first process of FIGS. 3A-3B.
Figures 7A, 7B:
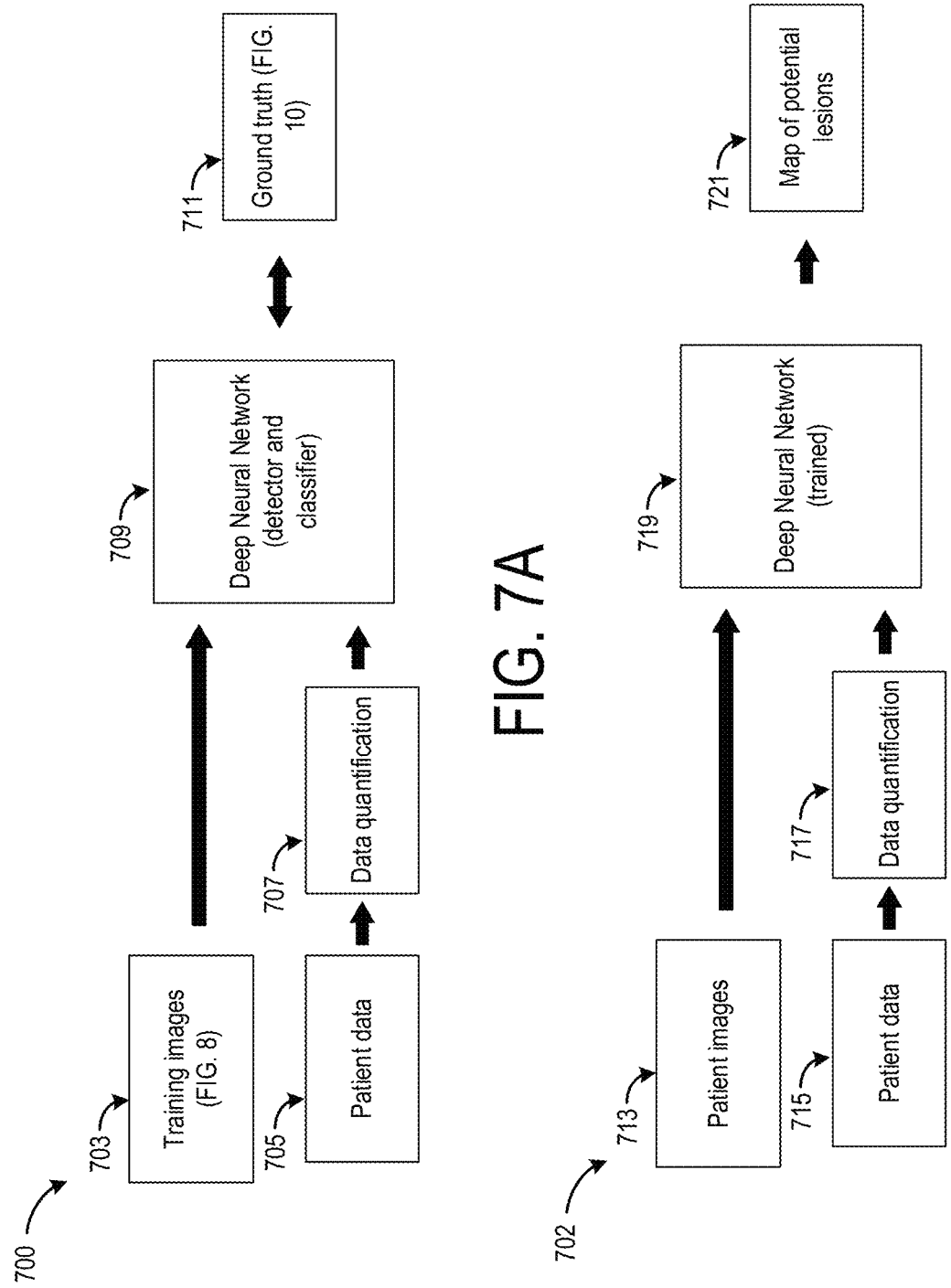
FIG. 7A shows a flow diagram for a learning phase of a second process for training and implementing a Deep Neural Network, in conjunction with the method of FIG. 2.
FIG. 7B shows a flow diagram for an inference phase of the second process.
Figure 8:
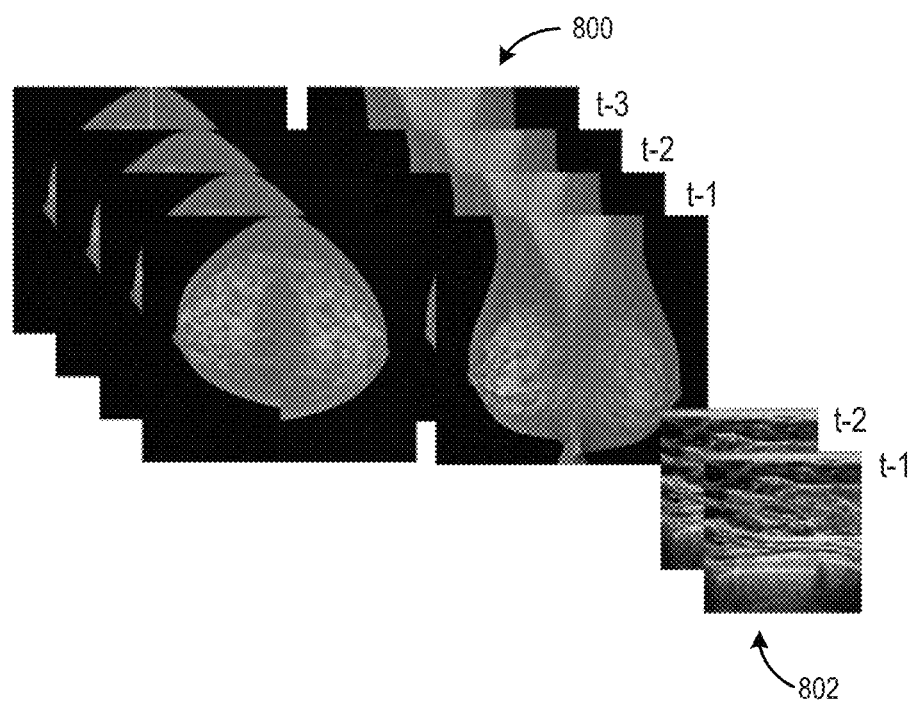
FIG. 8 shows examples of training images used to train a model to detect and localize potential lesions.
Figure 9:
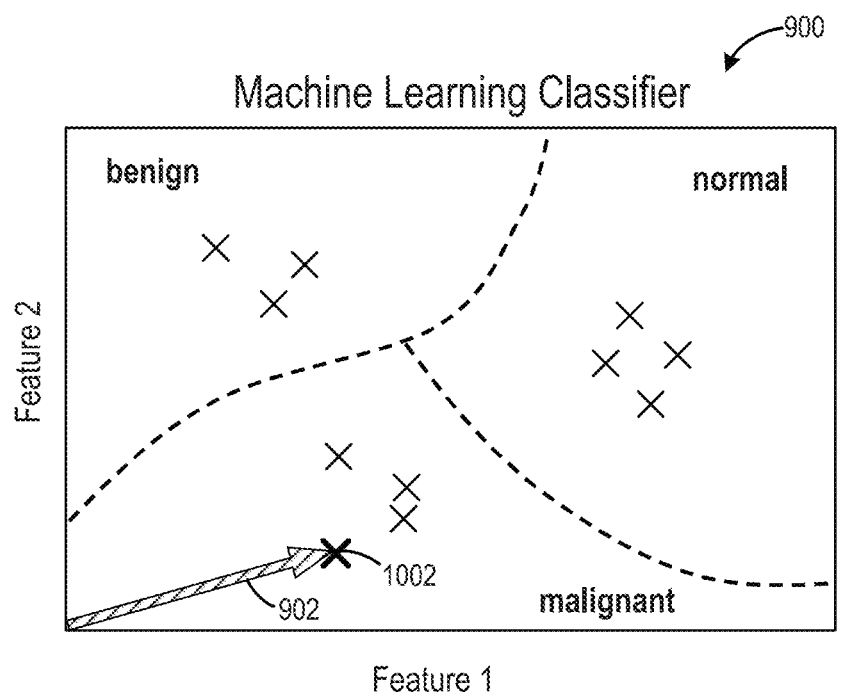
FIG. 9 shows an example of a features space plot generated during training of a Machine Learning Classifier to classify extracted features from training images.
Figure 10:
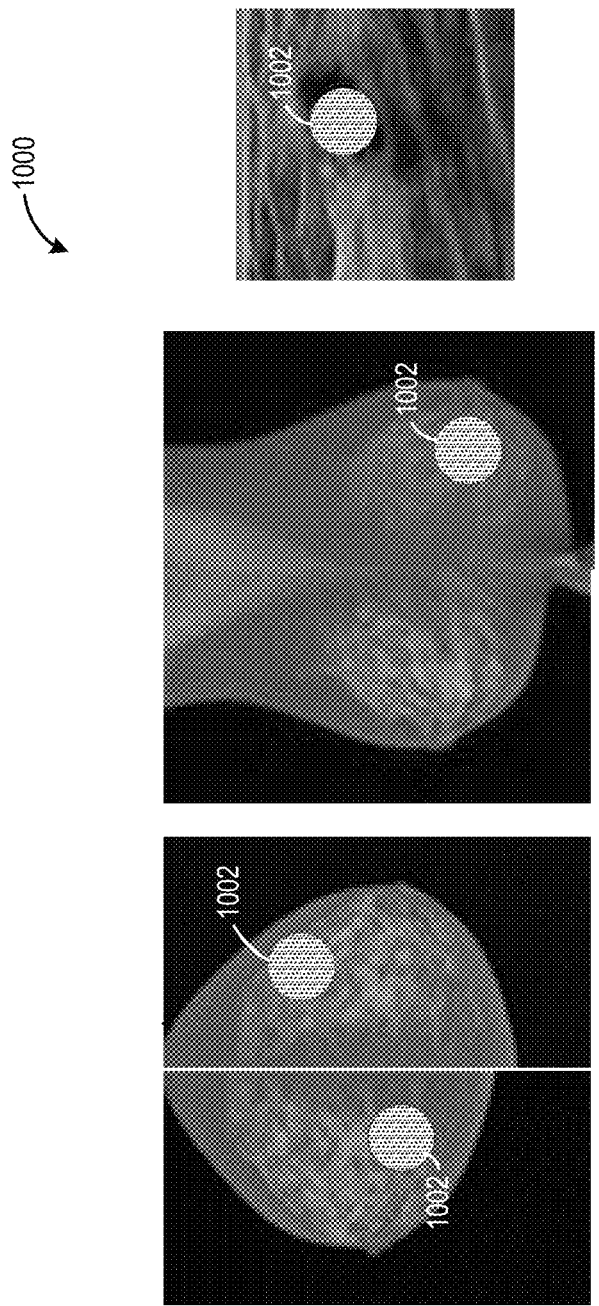
FIG. 10 shows examples of ground truth images used to train a Machine Learning Classifier to detect and localize potential lesions.
Figure 11:
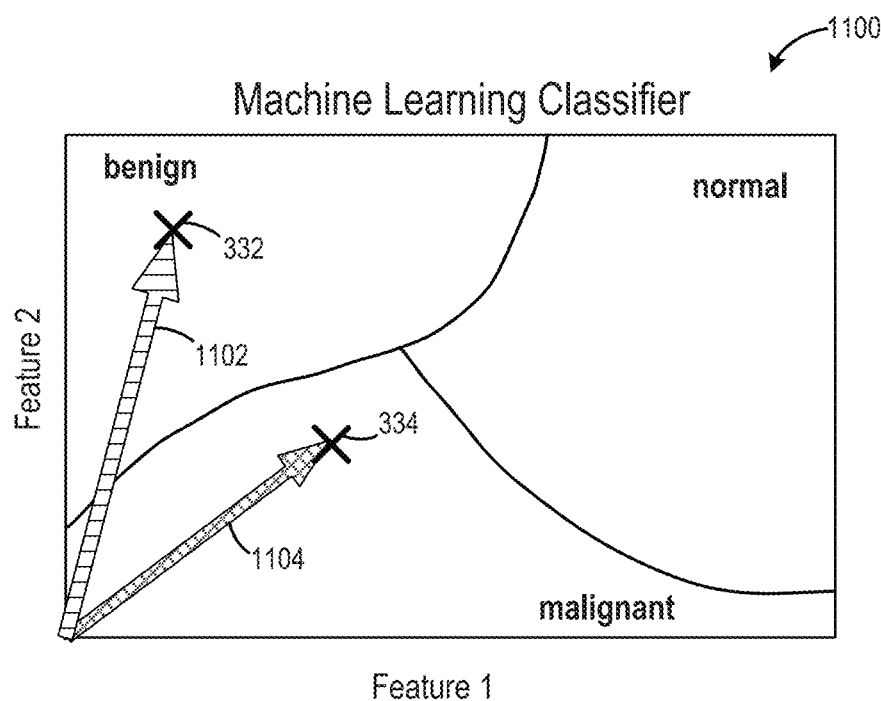
FIG. 11 shows an example of a features space plot generated by the trained Machine Learning Classifier to classify extracted features from patient images.
Figure 12:
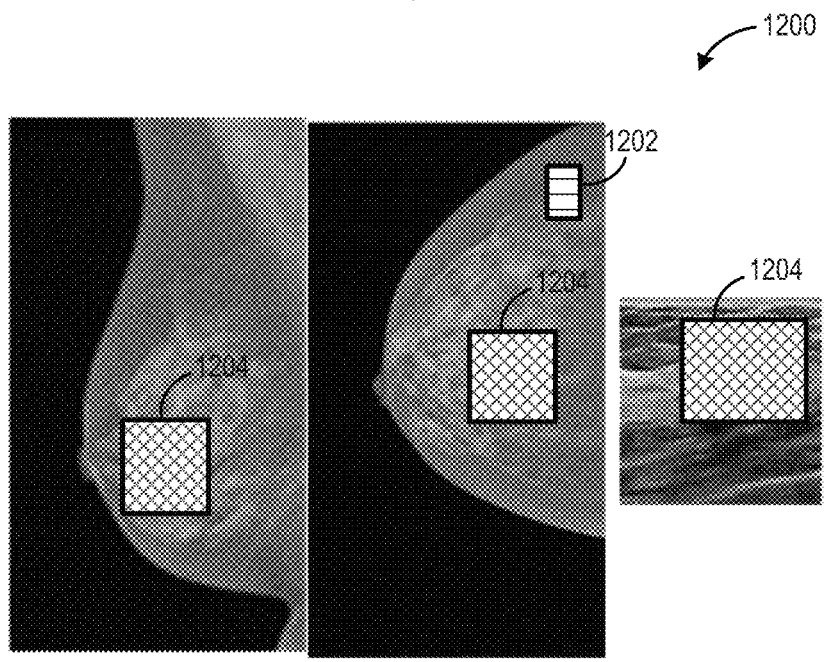
FIG. 12 shows an example of a probability map output by a model trained to detect and localize potential lesions.

Method 200 may include outputting a map indicating the probability of appearance of a lesion in the patient images input during the inference phase. The model of method 200 may be either a Machine Learning Classifier, as shown in FIGS. 3A-3B, or a Deep Learning Neural Network, as shown in FIGS. 7A-7B. When the Machine Learning Classifier is used, as described in FIGS. 3A-B, images input into the system during the learning phase may be registered, as shown in FIGS. 4-6, to match characteristics of images compared to one or more reference images. The reference images may be one or more of the patient images used to train the model during the learning phase or analyzed by the model during the inference phase. As an example, four images may be acquired during mammography screening exams: two images of the left (L) breast (e.g., LCC, LMO), and two images of the right (R) breast (RCC, RMLO) where CC is a cranio-caudal view and MLO is a medio-lateral oblique view. The one or more reference images may be one of the R or L images if identification of asymmetries between the L and R breast is desired. As another example, the one or more reference images may be a RMLO view acquired at an initial time (t0) used to determine any changes in the R breast from a series of RMLO images acquired at different times relative to t0. Examples of patient images with no visible lesions used during the learning phase of both the Machine Learning Classifier and the Deep Neural Network are shown in FIG. 8, an example of a features map output by either the Machine Learning Classifier or the Deep Neural Network, also during the learning phase, is depicted in FIG. 9, and ground truth images input to either the Machine Learning Classifier or the Deep Neural Network to compare to the patient images during the learning phase are shown in FIG. 10. Once the Machine Learning Classifier or the Deep Neural Network has been trained, it may be used to assess new patient images and classify extracted features according to a features space plot illustrated in FIG. 11 to output a probability map indicating areas of increased probability, e.g., inferred regions, of lesion appearance with respect to the patient's anatomy, as shown in FIG. 12.

Turning now to FIG. 1, a block diagram is shown of an embodiment of an imaging system 10 configured both to acquire original image data and to process the image data for display and/or analysis in accordance with exemplary embodiments. It will be appreciated that various embodiments are applicable to numerous medical imaging systems implementing an X-ray tube, such as X-ray or mammography systems. Other imaging systems such as computed tomography (CT) systems and digital radiography (RAD) systems, which acquire image three-dimensional data for a volume, may also benefit from the present disclosure. The following discussion of imaging system 10 is merely an example of one such implementation and is not intended to be limiting in terms of modality.

As shown in FIG. 1, imaging system 10 includes an X-ray tube or source 12 configured to project a beam of X-rays 14 through an object 16. Object 16 may include a human subject. X-ray source 12 may be conventional X-ray tubes producing X-rays 14 having a spectrum of energies that range, typically, from thirty (30) keV to two hundred (200) keV. The X-rays 14 pass through object 16 and, after being attenuated, impinge upon a detector assembly 18. Each detector module in detector assembly 18 produces an analog or digital electrical signal that represents the intensity or the number of photons of an impinging X-ray beam, and hence the attenuated beam, as it passes through the object 16. In one embodiment, detector assembly 18 is a scintillator-based detector assembly, however, it is also envisioned that direct-conversion or photon-counting type detectors (e.g., CZT detectors, etc.) may also be implemented.

A processor 20 receives the signals from the detector assembly 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the imaging system 10 and view the reconstructed image or other data from computer 22 on a display 26 (e.g., display unit). Additionally, console 24 allows an operator to store the generated image in a storage 28 (e.g., storage device) which may include hard drives, floppy discs, compact discs, etc. The operator may also use console 24 to provide commands and instructions to computer 22 for controlling a source controller 30 that provides power and timing signals to X-ray source 12.

FIG. 2 shows a flow chart of an example method 200 for predicting occurrences of clinical findings, such as lesions. Method 200 may be implemented at an imaging system, such as the X-ray system of FIG. 1, and executed by a processor of the imaging system. Method 200 includes inputting patient images and data to generate and/or train a model during a learning phase, where the model may rely on either a Machine Learning Classifier or a Deep Neural Network stored at a memory of the processor. The learning phase includes analyzing images and data for a group of patients, acquired at a time, e.g., during a first imaging event, when no lesion was identified in the images by a radiologist. The learning phase further includes using the analysis output in conjunction with images and data acquired at a subsequent time, e.g., during a second imaging event occurring after the first imaging event, when a lesion was identified in the patient. The group of patients may represent a targeted population to which an inference phase may be applied using the model. Increasing a number of patients included in the group of patients may increase the accuracy of the model in predicting occurrences of lesions.

The model may be built by the Machine Learning Classifier, as described in FIGS. 3A-B, or generated via the Deep Neural Network, as described in FIGS. 7A-B. Both types of model development processes may be used to predict and localize a potential lesion. The model may be applied to images and data for a patient, e.g., any other patient, during the inference phase of the method. The inference phase includes using the trained model to predict and localize lesions in the images of the patient, which may be newly acquired images with or without corresponding prior images obtained during previous imaging events. In some examples, predicting occurrence of lesions in the images with corresponding prior images may provide more opportunities for the model to establish a robust prediction regardless of whether a lesion is actually present. Method 200 may include generating a map indicating a likelihood of lesion appearances and outputting the map at a display device.

At 202, method 200 includes collecting input patient images and data. The input patient images and data may include images and data from one or more patients. As described above, the one or more patients may be a group of patients that is representative of a specific population of patients. For example, the specific population may represent patients with a common health issue, patients of a common age group, patients with a common medical history, etc. The input images for the patients may include previous images and data, acquired at a time when no lesion was identified on the patients, as well as subsequent images of the same patients in which a clinical finding was detected by a radiologist, which are hereafter referred to as ground truth images.

The ground truth images and the images acquired when no lesion was identified may be used to train the model. The images may include radiological images collected from an imaging system, such as system 10 of FIG. 1. The input patient data may include, but is not limited to, patient history covariates (e.g., gender, age, age at menarche, age at first full-term pregnancy, age at menopause, parity, family history, alcohol use, body mass index, hormone use, Tamoxifen use, etc.), breast composition covariates (e.g., percent glandular tissue, absolute dense tissue volume, etc.), and genomics and proteomics covariates (e.g., expression of estrogen receptor, expression of progesterone receptor, BRCA1 and BRCA2 mutations, expression of human epidermal growth factor receptor 2 (HER2/neu), expression of Ki-67 protein, etc.). To be processed numerically, the data may be quantified if not available in a numerical format. Additionally, patient data may include measures made on biological samples of the body of the patient and additional information related to relatives of the patient.

At 204, the input patient images and data are processed at the learning phase of the process to build (e.g., train) the model to predict and localize where a lesion may appear in an imaged region of the patient's anatomy. In one example, the model may be built using a Machine Learning Classifier, further described in FIG. 3A, or a Deep Neural Network, further described in FIG. 7A. The model may be generated and/or trained based on the previous images, an analysis may be output by the model based on the previous images, and the model may be trained to compare the output analysis output to the subsequent images of the patients, e.g., where one or more clinical findings are identified. A training data set is therefore generated when new clinical findings are detected, where the training data set may include training images and patient data/information. The training data set may be used to build or update the Machine Learning Classifier or the Deep Neural Network to generate the model and the model may be applied to patient images and data to predict and localize where a lesion may appear.

At 206, new radiological images of a new patient may be obtained by an imaging system, such as the system 10 of FIG. 1, and input to the model. The new patient may, for example, be a different patient from the one or more patients from which the images and data were obtained as input to the learning phase. However, in other examples, the new patient may be one of the patients from which the images and data were obtained to train the model. The new images of the new patient may be input for inference in parallel with the training image and data input at 202 for the learning phase. Additionally, new data for the patient may be input and may include, but is not limited to, patient history covariates, breast composition covariates, and genomics and proteomics covariates, etc., as described above at 202.

At 208, the model is applied to the input images during the inference phase of the model to predict and localize where a lesion may appear on the images. Depending on the process by which the model is generated, e.g., by the Machine Learning Classifier or the Deep Neural Network, potential lesions may be predicted and localized as further described with respect to FIGS. 3B and 7B for the Machine Learning Classifier and the Deep Neural Network, respectively. For both processes, a map may be generated where the map provides indication of a probability of lesion occurrence in the images. More specifically, the map may flag areas identified to have a high likelihood of lesion formation that are not yet visible in the images but may become visible in future images after the lesion has become larger in size.

At 210, method 200 displays output results, e.g., the generated probability map showing the probability of lesion occurrence, at a display device, such as the display unit 26 of FIG. 1. Method 200 ends.

By learning characteristics of images and patient data that may be precursors to lesion appearance, a model may utilize one of a machine learning algorithm or a deep neural network to enable prediction and localization of a lesion on a patient image prior to visual appearance of the lesion on the image. In this way, when a probability of lesion formation is estimated to be high, clinicians may choose to monitor the patient more frequently or begin treatment earlier in lesion growth compared to circumstances where the lesion is identified by conventional methods, e.g., visual identification by a radiologist or other clinician. By the time the lesion is visually identified by conventional methods, the lesion may be further along in growth compared to a lesion identified by method 200.

FIGS. 3A-B show example flow diagrams for building a model for identifying regions with increased lesion formation probability from images, depicted as a first process for training and implementing a Machine Learning Classifier, respectively, as described in method 200. The first process includes a learning phase 300, as shown in FIG. 3A, where input images of one or more representative patients are registered and local features of the input images are extracted and classified alongside quantified input patient data with the Machine Learning Classifier. Further details regarding image registration are described in FIGS. 4-6. Furthermore, images of the representative patients with detected localizations of lesions may be used to train the Machine Learning Classifier, as described further below and illustrated in FIG. 8.

The first process also includes an inference phase 302, as shown in FIG. 3B, during which images of a new patient are analyzed using the trained Machine Learning Classifier, which infers where lesions may appear based on extracted local features, quantified data, and vectors of measures. Analysis by the Machine Learning Classifier generates a map of potential lesions on the images of the patient, as shown in FIG. 12, which indicates a probability of appearances of lesions in the images that may not be yet visible on the current images but may become visible on later images of the patient.

Turning first to FIG. 3A, it shows the learning phase 300 of the Machine Learning Classifier, which may be implemented at 204 of FIG. 2. At 303, training images are input from prior exams of the representative patients where no lesions were detected. For example, as shown in FIG. 8, first patient images 800 and second patient images 802 may be used as the training images of FIG. 3. The first patient images 800 show multiple views of at least one breast from prior exams at times t−1, t−2, and t−3, where time t is representative of an exam during which a lesion is detected. In one example, images acquired at time t may be used as ground truth images. The second patient images 802 shows images acquired with a different imaging modality. For example, the first patient images 800 may be obtained by a first imaging modality, such as ultrasound, and the second patient images 802 may be acquired by MRI, although other types of imaging techniques may be used. Thus images input to the model may be multimodal and subsequent processing of the images may be adapted according to the modality used. Returning to FIG. 3A, the training images may be registered at 309, to be further described with reference to FIGS. 4-6.

At 311, feature extraction is performed on local regions of interest (ROIs) of the training images, based on the image registration. More specifically, the image registration at 309 enables identification of differences between images, e.g., at least one image of differences may be computed after registration to generate vectors of features (e.g., vectors of features 310 as indicated at 312) computed from different regions of interest (ROIs) in the at least one image of differences. The differences between images may be determined based on comparison of images on a scale of pixels, for example, according to variables such as a difference in pixel intensity, appearance of markers (such as shape, size, etc.) etc., observed across the training images that correspond to the lesions. The features may be extracted from a set of images including the training images input at 303 and the at least one image of differences, and may include measurements made on the ROIs of the set of images.

Additionally, patient data may be entered at 313 and quantified at 315, in parallel with image registration at 309 and feature extraction at 311. For example, the patient data may include, but is not limited to, patient history covariates, breast composition covariates, and genomics and proteomics covariates, as described above with respect to FIG. 2. The patient data may also include measurements made on biological samples of the body of the patient and additional information related to relatives of the patient. To be processed numerically by the Machine Learning Classifier, the patient data may be converted to a numerical format at 315, if not already available in the numerical format.

At 312, the patient data that is quantified at 315 and features extracted from the set of images at 311 are both used to generate the vectors of features 310. Each vector of the vector of features 310, represented as rectangles in FIGS. 3A and 3B, may correspond to features computed from the set of images for a given ROI and the quantified patient data. Each vector may be input to the Machine Learning Classifier at 317. For example, if a number of features is N, then the Machine Learning Classifier is operating in N-dimensional space with N features. As an example, a two-dimensional vector (e.g., N=2) may be obtained if both of a mean value of pixel grayscale and a variance of the pixels is measured at each ROI. The ROIs may then be assigned to one of K classes (e.g., K=3), the K classes defined for example as normal, benign, and malignant. The Machine Learning Classifier may be configured to classify the ROIs based on the coordinates of each vector of features. In order to do so, the Machine Learning Classifier may first be trained with examples. The examples may be cases for which ground truth information is known, e.g., images and patient data where of one or more lesions in the images at time t is identified, as well as spatial coordinates of the lesions. For each ROI of an example, a vector of features (e.g., a feature vector) may be computed and assigned to one of the K classes by comparing the spatial coordinates of the ROI with the ground truth information. In other words, each ROI may correspond to at least one vector of features.

For example, ground truth information may be presented to the Machine Learning Classifier at 319 of the learning phase 300 of FIG. 3A. As shown in FIG. 10, the ground truth corresponds to a set of labelled images 1000 of the patient taken at time t, where lesions (as indicated by dots 1002) are detected by radiologists. Each pixel of images 1000 has a label corresponding to one of the K classes according to a nature of the tissues detected by the radiologist (e.g., normal, benign and malignant), and the dots 1002 represent the observed and identified lesions. The set of labelled images 1000 may be fed to the Machine Learning Classifier at 317 of FIG. 3A to be compared to the vector of features 310 extracted from ROIs of the training images after registration at 309, as well as to correlated patient data after quantification at 315. Paired information between the labels of the training images and feature vectors may be used to modify parameters of the Machine Learning Classifier to increase its accuracy in predicting where lesions may occur.

Turning now to FIG. 9, a prediction of the Machine Learning Classifier is illustrated in a feature space plot 900. The feature space plot 900 depicts N-dimensional feature space (with N=2 in this illustration) divided amongst the K classes (e.g., K=3 with classes corresponding to benign, normal, and malignant tissues) by dotted lines. The dotted lines are plotted based on the comparison of the ground truth information (or labels) to the feature vectors 310 of FIG. 3A. Each vector may be plotted according to its coordinates and as more and more images and patient data are input to the Machine Learning classifier, the dotted lines are modified to increase the accuracy of the classifier, thereby decreasing classification errors. As an example, a feature vector 902 corresponding to one of the feature vectors 310 of FIG. 3A is shown in the feature space plot 900, and may represent malignant tissues as indicated by labelling of the ground truth images at 319 (e.g., the dots 1002 of FIG. 10). Machine learning algorithms which may be used for training the classifier, as indicated and described with respect to the feature space plot 900, include multilayer perceptron (MLP), support vector machine (SVM), Random Forests, among others.

The learning phase 300 of the first process therefore includes learning the classifier parameters from feature vectors (quantified data and image features), by comparing images from time t (at which radiologists were able to detect lesions), on which ground truth is known (e.g., one class for each image pixel) with images from time t−1, t−2, etc. (e.g., times at which no lesion was detected by radiologists). In some examples, after the learning phase 300 is executed, the model may be updated via continuous training which may update parameters of the Machine Learning Classifier based on subsequent cases where lesions are detected. The cases may be flagged/reported and sent to a computer, e.g., processor, with algorithms configured to update the parameters.

As shown in FIG. 3B, during the inference phase 302, the trained Machine Learning Classifier is applied to different patient images at 323, which may be obtained from a same or different patient as the training images of FIG. 3A. The patient images may be generated by an imaging system at time t, such as system 10 of FIG. 1, and may be obtained from a plurality of times prior to time t, such as at t−1, t−2, etc. Furthermore, the patient images may not include visible signatures of any clinical findings. Processes implemented during the inference phase 302 may be similar to those described above with respect to the learning phase 300, and therefore will not be re-introduced for brevity.

The images of the new patient (e.g., a patient that may be the same or different from the patient from which the training images were obtained) may be registered at 324, as described in further detail with reference to FIGS. 4-6, and feature extraction at the ROIs may be conducted at 325, as described above at 311 of the learning phase 300 of FIG. 3A. Additionally, patient data is input at 327 and quantified at 329, in parallel with image registration and feature extraction, as described above at 315 of FIG. 3A. Extracted image features and quantified data are concatenated as feature vectors 330 at 331, combining, for each ROI, quantified patient information and extracted features from the patient images.

At 333, the trained Machine Learning Classifier is applied to the feature vectors 330 and patient data quantified at 329. For example, as shown in FIG. 11, the vectors may be illustrated in a feature space plot 1100, where partitions between classes are defined by solid lines (e.g., finalized boundaries determined based on the learning phase 300). Feature vectors extracted for ROIs of patient images and patient data may be mapped to the feature space plot 1100 to determine which class the ROI may be assigned to. As examples, a first feature vector 1102 may be mapped at the feature space plot 1100 according to a first extracted feature vector 332 of the feature vectors 330 of FIG. 3B and a second feature vector 1104 may be mapped according to a second extracted feature vector 334 of the feature vectors 330 of FIG. 3B. The first feature vector 1102 may be classified as a benign feature while the second feature vector 1104 may be classified as a malignant feature.

Results of the classification may be displayed as a map of potential lesions at 335 of FIG. 3B. The map may include highlighted ROIs on the images that have been determined by the trained Machine Learning Classifier to have an increased probability of lesions appearing. For example, the map of potential lesions may be displayed as selected patient images 1200, as depicted in FIG. 12, with the highlighted ROIs shown as shaded rectangles for illustrative purposes. A first ROI 1202 is indicated at one of the selected patient images 1200, which corresponds to the first feature vector 1102 of the feature space plot 1100 of FIG. 11. A second ROI 1204 corresponds to the second feature vector 1104 of FIG. 11 and is highlighted at each of the selected patient images 1200 of FIG. 12. Regions determined to have a high likelihood of lesion formation, whether malignant or otherwise, are thereby presented to a patient in a clear and comprehensive manner, directly relating the regions to anatomical images and indicating specific locations of the regions on the patient's body.

As described above, a region identified by the Machine Learning Classifier may be anatomical regions determined to have increased likelihood of a lesion, e.g., a predicted region. In other words, the lesion may not be yet visible on the current and prior images of the patient under inference but may become visible on future images of the patient based on the trained classifier. In one example, a region with a higher probability of lesion appearance, such as the first and second ROIs 1202 and 1204 of FIG. 12, may be indicated as a brighter, or otherwise more intense highlighted region compared to regions with a lower probability of lesion apparition. For example, a brightness of an ROI may be modified, or a color assigned to the ROI, where the classes of the Machine Learning Classifier may each be represented with a different color. As another example, a marker may be drawn at the position of the ROI with shapes representative of the assigned class. As yet another example, annotated text may be added near a bounding box corresponding to the ROI where the annotated text may indicate the class assigned to the ROI by the Machine Learning Classifier.

As described above with reference to FIGS. 2-3B, the model for predicting occurrences of lesions may be generated by the Machine Learning Classifier during the learning phase. Lesion-free images, images showing one or more detected lesions, and patient information may be used to train the Machine Learning Classifier to accurately predict where lesions may occur in the patient. The predicted lesion locations may be presented to an operator as a probability map, thereby displaying the results in an efficient manner.

Optional pre-processing of images may be applied before feature extraction and the pre-processing depicted in FIGS. 4-6. For example, training and inference may include registration of the images, as described above. Turning now to FIG. 4, it shows an example display of registered and unregistered images, obtained in conjunction with the flow diagrams of FIG. 3A and FIG. 3B. The unregistered images may be collected at different dates (e.g., t versus t−1) and incidences (e.g., an x-ray path such as CC view versus a MLO view), and under different imaging modalities or equipment. Use of multimodal images may enhance distinction of tissue content based on image processing. As described above, the images may be collected via different imaging modalities and registration of the images may therefore be modified according to the modality, individually or in combination. For example, x-ray images may be registered together, ultrasound images may be registered together and separate from the x-ray images, x-ray images may be registered with ultrasound images, etc. As one example, contralateral images may be registered through a registration operator Γ to match the characteristics of a reference image 406 (e.g., image $f_t$). Images labelled with f (e.g., $f_t$ and $f_{t-1}$) may be images of a right breast and contralateral images labelled with g (e.g., $g_t$ and $g_{t-1}$) may be images of a left breast.

A first set of images 402 may be acquired at time t. In one example, time t is a time of an exam when a lesion is detected from images obtained during an imaging event. A second set of images 404 may be acquired at time t–1, which may be a time prior to time t. At time t, the reference image 406 and a first contralateral image 408 may be captured by a radiological imaging system, such as system 10 of FIG. 1. The second set of images 404 includes a first image 410 and a second contralateral image 412. The reference image 406 may present an anatomical region (e.g., the right breast) in a desired orientation/view that other images will be adjusted to by the registration operator Γ. The registration operator Γ may register the images to match characteristics of the anatomical region, including but not limited to a skin line, shape, brightness intensity, etc.

For example, at 309 of the learning phase 300 of FIG. 3A, images may be modified for registration by the registration operator Γ. A top row of images in FIG. 4 shows unregistered images from times t and t–1 of each breast. A bottom row of images presents the reference image 406 and modified images from times t and t–1, including a modified first contralateral image 418, a modified first image 420 (e.g., a modification of the first image 410 by the registration operator Γ), and a modified second contralateral image 422 (e.g., a modification of the second contralateral image 412 by the registration operator Γ). Each of the modified images have the same orientation as the reference image 406. For example, the first contralateral image 408 may be flipped across a vertical plane to generate the modified first contralateral image 418, where the vertical plane is parallel with a y-axis of a set of references axes 401. Similarly, the second contralateral image 412 may be flipped across the vertical plane to generate the modified second contralateral image 422. Further details of generation of the registered images from the unregistered images is elaborated below, with reference to FIG. 6.

By modifying the images to be registered, the images captured with different orientations and views, to produce images with the same orientation and view, the resulting registered images may be directly compared with one another. For example, as described with respect to FIG. 5, the direct comparison may assist with identifying a signature that may be a precursor to a clinical finding associated with a lesion. A model, such as the model generated by the Machine Learning Classifier of FIGS. 3A, may be trained with the signature to detect and localize potential lesions in patient images before the lesions become visible to the radiologists. By the time the lesions become visible, severe treatment protocols, e.g., treatment associated with undesirable side effects to a patient, may be demanded. Early detection of the lesions may allow milder treatment strategies to be applied.

FIG. 5 shows an example collection of registered images 500 which includes several of the images of FIG. 4. For example, the collection of registered images 500 includes the reference image 406, the modified images of FIG. 4 (e.g., the modified first contralateral image 418, the modified first image 420, and the modified second contralateral image 422) as well as combinations of the images, hereafter, compilation images. For example, a first compilation image 504 is a combination of images 406 and 420, a second compilation image 506 is a combination of images 406 and 422, and a third compilation image 508 is a combination of images 406 and 418. The different combinations of the images may reveal features of interest. For example, differences between parent images (e.g., the images from which the compilation images are derived) having the same view of the same breast but acquired at different dates may capture temporal evolution of the features of interest. As another example, observed differences between parent images showing the same view of both breasts acquired at the same date may capture asymmetries, or differences between parent images showing the same view of both breasts acquired at different dates may capture both temporal evolution and asymmetry. As such, the first compilation image 504 may show temporal evolution, the second compilation image 506 may show both temporal evolution and asymmetry, and the third compilation image 508 may show asymmetry. Differences specific to the right breast may be depicted in a different color, for example, from differences specific to the left breast. The collection of registered images 500 may be generated as an output of image registration, for example, at 309 of FIG. 3A, and be input for feature extraction, for example, at 311 of FIG. 3A and 325 of FIG. 3B.

FIG. 6 shows an example of a warping process conducted by the registration operator Γ using mesh deformation. The unregistered images of FIG. 4, e.g., the reference image 406, the first contralateral image 408, the first image 410, and the second contralateral image 412, are depicted in a collection of unregistered images 602. The warping process of FIG. 6 may be applied to the collection of unregistered images 602 to generate the registered images shown in FIGS. 4 and 5. A set of processed graphs 604 are illustrated to the right of the collection of unregistered images 602, showing results of the warping process.

A skin line 614 may be generated based on the reference image 406, and the skin line 614 may be applied to each of the first image 410, the first contralateral image 408, and the second contralateral image 412. The skin line 614 may be used to constrain a deformation of a mesh 615, as shown in the set of processed graphs 604, when applied to the first image 410, the first contralateral image 408, and the second contralateral image 412. The mesh 615 may include nodes 617 and edges 619 and may cover an area of the imaged breast to enable a warping of the images that satisfies different defined constraints, such as spatial and intensity constraints. For example, the modified images may be warped such that the skin line 614 of the modified images are superimposable to the skin line of the reference image 406.

Deformations along the x-axis (e.g., with respect to the references axes 401), deformations along a y-axis, and intensity deformations, as described below, may be estimated by differences between the mesh 615 applied to the images and the reference image 406 at the nodes 617 of the mesh 615. For example, one of the nodes 617 of the mesh 615 applied to the first image 410, e.g., as depicted by graph 620, may be compared to a corresponding node at the reference image 406 and the first image 410 may be deformed accordingly by displacing the node at the first image 410 to match the position of the corresponding node at the reference image 406. Upon measurement, the deformations for each of the nodes 617, e.g., a horizontal (e.g., x-axis) and vertical (e.g., y-axis) displacement of each node, may be interpolated to each pixel of the images (e.g., 408, 410, 412). For example, bi-linear or bicubic splines interpolation strategies may be used. The deformations applied to each pixel of the images, which may be affine transformations in one example, may enable pairs of images to be combined by matching the images according to skin line and intensity.

The set of processed graphs 604 show measured kinematics for deformations along the x-axis (e.g., x-deformation) at a first column 616 of the graphs 604, deformations along the y-axis (e.g., y-deformation) at a second column 618, and intensity deformations at a third column 621, where the set of processed graphs 604 are generated based on the collection of unregistered images 602. For example, as indicated by arrows in FIG. 6, x-deformation of the first image 410 to match the mesh 615 of the reference image 406, under the constraint of a similar skin line shape and position, is depicted at graph 620, x-deformation of the first contralateral image 408 is depicted at graph 624, and x-deformation of the second contralateral image 412 is depicted at graph 628. Similarly, y-deformation of the first image 410 is shown at graph 622, y-deformation of the first contralateral image 408 is shown at graph 626, and y-deformation of the second contralateral image 412 is shown at graph 630.

A correction based on intensity deformation may also be applied to the collection of unregistered images 602 to provide the intensity deformations shown at the third column 621. Variations in intensity may be used to deform the images to which the mesh 615 is applied, matching intensity features common to the warped image and the reference image 406. Anomalous intensity features may thereby be identified. For example, intensity deformation of the first image 410 is shown at graph 632, intensity deformation of the first contralateral image 408 is shown at graph 634, and intensity deformation of the second contralateral image 412 is shown at graph 636. The images, after undergoing deformations, may be used to generate the compiled images shown in FIG. 5 and used to output the map of potential lesions at 335 of FIG. 3B.

As shown in FIG. 2, the learning phase (e.g., training of the model at 204) and the inference phase (e.g., application of the model to an image set at 208) may be implemented in a second process that relies on training and application of a Deep Neural Network, instead of the Machine Learning Classifier, to generate the model for predicting occurrences of lesions. The second process is depicted in FIGS. 7A-7B by example flow diagrams for generating the model via the trained Deep Neural Network. Overall, the Deep Neural Network provides a similar output as the Machine Learning Classifier. For example, during a learning phase 700 of the second process, as shown in FIG. 7A, the Deep Neural Network is trained with input training images of a patient as well as quantified patient data. The training images include images without lesions paired with images of the same patients with lesions that are detected by radiologists and used as ground truth information in the learning phase 700. During an inference phase 702 of the second process, as shown in FIG. 7B, images of a new patient are analyzed using the trained Deep Neural Network, which infers where lesions may appear in future images of the new patient based on the input images and quantified patient data. A map of potential lesions may be output by the trained Deep Neural Network model, which indicates a probability of appearance of lesions in the images that may not be yet visible on the current images but may become visible on later images of the patient.

Turning first to FIG. 7A, it shows the learning phase 700 of the second process, which may be implemented at 204 of method 200. At 703, training images are input from prior exams of the patient in which no lesions were observed. Examples of the training images are shown in FIG. 8, as described above. Additionally, patient data is entered at 705 and quantified at 707. For example, patient data may include, but is not limited to, patient history covariates, breast composition covariates, and genomics and proteomics covariates, as described with respect to FIG. 2. The patient data may also include measurements made on biological samples of the body of the patient and additional information related to relatives of the patient. To be processed numerically by the Deep Neural Network, the patient data may be numerically quantified at 707, as described above with reference to FIG. 3A, if not already available in a numerical format.

Quantified patient data and input training images are fed to the Deep Neural Network at 709, which may be configured as a detector and a classifier. Additionally, at 711, ground truth images, taken at time t where lesions are detected may be input and paired with the training images. The ground truth images, which may be similar to the ground truth images depicted in FIG. 10, may provide ground truth information to be compared to results predicted by the Deep Neural Network based on the input images and quantified data. The Deep Neural Network, similar to the Machine Learning Classifier, may partition data into K classes (e.g., normal, benign, and malignant) and may be configured to determine an error (e.g., a loss function) between the predicted partitioning of the classes and the ground truth information. Internal parameters of the Deep Neural Network may be updated based on the errors. For example, a weight and bias of each artificial neuron may be modified in response to computation of the loss function. Training of the Deep Neural Network may proceed, e.g., with other paired examples of images with truth images, until the loss function is acceptably small. As such, the training may converge to a solution and may be deemed complete, enabling the trained model to be used for inference of images from new patients.

As described above for the learning process of the Machine Learning Classifier model, in some examples, the Deep Neural Network model may be continuously trained based on new cases where a lesion is detected. The new cases may be flagged and/or automatically sent to a computer and algorithm to update parameters of the Deep Neural Network.

During the inference phase 702, as shown in FIG. 7B, patient images may be acquired at 713. For example, the images may be obtained from a new patient, e.g., a different patient from one or more patients from which the training images and patient data are collected during the learning phase 700 of FIG. 7A. Patient data may be obtained at 715 and quantified at 717 before being delivered to the trained Deep Neural Network at 719, along with the patient images. The trained Deep Neural Network may assess the patient images at 719 for features learned during the learning phase 700. A probability map of potential lesions may be generated and output by the Deep Neural Network at 721. The probability map may be similar to the map output from the Machine Learning Classifier, as described above at 335 of FIG. 3B and shown in FIG. 12.

In some examples, warping of the input images (e.g., the training images of FIG. 7A and/or the patient images of FIG. 7B), as described above with reference to FIGS. 4-6, may be implicitly executed by the Deep Neural Network. However, in other examples, the warping process may be performed prior to delivery of the input images to the Deep Neural Network. Furthermore, in other examples, the Deep Neural Network (and the Machine Learning Classifier of FIGS. 3A-3B) may be continually updated and trained as additional truth images are input to the respective model. As the number of input truth images increases, the accuracy of the model may also increase.

In this way, early identification of lesions is enabled, based on images collected prior to a presence of lesions visible in a patient image data set. The images may be used to construct a model that is trained based on the images to predict future occurrences of lesions. The model may rely on machine learning or deep learning and may incorporate additional patient information, in addition to the images. By extracting features from the images and determining differences amongst the images, information regarding time evolution and/or asymmetry may be provided. The model may be applied to a variety of imaging techniques and may reduce an intensity of treatment as a result.

The technical effects of using a model trained via machine learning or deep learning as specified above to infer regions of increased likelihood of lesions include rapid analysis of acquired images by comparison of the acquired images to retrieved reference images. The analysis of the acquired images includes execution of image registration by a processor that is programmed to carry out the deep neural network, which allows the acquired images to be aligned with the reference images, thereby increasing an accuracy of the inferred regions. The model may further enable large quantities of training data to be organized chronologically and signatures corresponding to lesions to be detected in the chronologically ordered training data, even before the signatures are visible to the human eye, this improving the real-time processing of the present approach. As such, the training data may be simultaneously analyzed and processed to generate compiled data for training the model.

In addition, the model may be trained using the training images and training data where the references images are stored in one location, with information from the training images and training data incorporated therein, and readily retrieved by the model. The reference images may be automatically updated based on acquired images where lesions are observed with the results stored with the references images rather than as individual files. As a result, information obtained from multiple image and data sets may be consolidated into one set of images, stored at the one location, thus reducing data storage requirements. Further, analysis of the acquired images may therefore be conducted efficiently and with reduced processor power. Furthermore, by consolidating the training information into the reference images, an amount of storage space occupied by the reference images may be reduced. Overall, the process for examining, identifying regions with high lesion probability, and indicating the regions to a user may be executed with increased efficiency while reducing a processing and storage burden on the processor.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The disclosure also provides support for a method for identifying an occurrence of lesions in a patient, comprising: feeding first images collected from one or more patients prior to appearance of lesions and second images collected from the one or more patients after appearance of the lesions to a processor to train a model to predict a location of a future lesion, the model stored at a memory of the processor and configured to compare regions of interest (ROIs) in the first images to corresponding ROIs in the second images, inputting third images collected from a new patient to the processor to infer regions for future lesions according to the model and mapping the regions to anatomical regions of the new patient, and displaying the regions in a probability map at a display unit to indicate areas of increased likelihood of lesion occurrence. In a first example of the method, the ROIs are compared in the first images to the second images to identify differences between the first and second images, the differences corresponding to the lesions in the second images. In a second example of the method, optionally including the first example, the model is trained based on classification of the ROIs according to partitions defining K classes of features learned when the first images and the second images are compared, the K classes corresponding to benign, normal, and malignant features. In a third example of the method, optionally including one or both of the first and second examples, the method further comprises: inputting patient data when the model is trained and during inputting of the third images, and wherein the patient data includes one or more of patient history, composition covariates, genomics, proteomics, and measures made on biological samples of a corresponding patient. In a fourth example of the method, optionally including one or more or each of the first through third examples, the patient data is quantified by converting the patient data into a numerical format. In a fifth example of the method, optionally including one or more or each of the first through fourth examples, the method further comprises: using one of machine learning and deep learning to build the model.

The disclosure also provides support for a method for predicting clinical findings, comprising: receiving patient images at a processor, the patient images free of clinical findings, wherein the processor is configured with a model trained to predict and localize an appearance of a clinical finding based on comparison of training images, patient data, and ground truth images, and outputting, at a display unit, predicted regions of increased likelihood of future clinical finding appearance from the model as a map displaying the predicted regions relative to anatomical regions of an imaged patient. In a first example of the method, the model is trained using a Machine Learning Classifier, and wherein the Machine Learning Classifier is configured to extract features indicative of the future clinical finding appearance from the patient images. In a second example of the method, optionally including the first example, the method further comprises: registering the patient images prior to inputting the patient images to the model, and wherein registering the patient images includes adjusting an orientation of the patient images to match an orientation of a reference image. In a third example of the method, optionally including one or both of the first and second examples, registering the patient images further includes determining a skin line based on the reference image and warping the patient images based on the skin line. In a fourth example of the method, optionally including one or more or each of the first through third examples, warping the patient images includes applying a mesh to each of the patient images and displacing nodes of the mesh to deform the patient images to allow skins of the patient images, after warping, to be superimposed on the skin line of the reference image. In a fifth example of the method, optionally including one or more or each of the first through fourth examples, outputting the predicted regions from the model includes computing feature vectors from the patient images and the patient data, and wherein computing the feature vectors includes computing one feature vector for each region of interest (ROI) identified by the model. In a sixth example of the method, optionally including one or more or each of the first through fifth examples, outputting the predicted regions from the model further includes partitioning a N-dimensional space of features according to N features in the feature vectors. In a seventh example of the method, optionally including one or more or each of the first through sixth examples, the model is trained using a Deep Neural Network, and wherein the Deep Neural Network is configured to partition the training images and the patient data into K classes and determine a loss function between the K classes of the patient images and the patient data and K classes of the ground truth images. In an eighth example of the method, optionally including one or more or each of the first through seventh examples, the patient images are warped one of prior to inputting the patient images to the model or after the patient images are delivered to the Deep Neural Network.

The disclosure also provides support for a method for predicting future occurrences of lesions in a patient, comprising: delivering a first set of images of the patient to a trainable model, the trainable model implemented at a computer processor communicatively coupled to an imaging system, to acquire predicted locations of the future occurrences of the lesions, wherein the trainable model outputs a probability map of the future occurrences of the lesions, at a display unit communicatively coupled to the computer processor, in a second set of images of the patient based on one of machine learning or deep learning. In a first example of the method, the first set of images do not show lesions. In a second example of the method, optionally including the first example, features are extracted from the first set of images and wherein the features indicate time evolution and/or asymmetry of the features amongst the first set of images. In a third example of the method, optionally including one or both of the first and second examples, the probability map highlights locations of the future occurrences of the lesions by one or more of highlighting brightness, color, shape of highlighting, and annotated text. In a fourth example of the method, optionally including one or more or each of the first through third examples, feeding the images to the trainable model includes feeding images acquired via different imaging modalities.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for identifying an occurrence of lesions in a patient, comprising:
   feeding first images collected from one or more patients prior to appearance of lesions and second images collected from the one or more patients after appearance of the lesions to a processor to train a model to predict a location of a future lesion, the model stored at a memory of the processor and configured to compare regions of interest (ROIs) in the first images to corresponding ROIs in the second images, wherein training the model includes:
      registering the first images to match characteristics of the second images using a registration operator;
      determining a skin line based on the second images;
      applying a mesh having nodes and edges to the first images;
      displacing the nodes to deform the first images to match the skin line of the second images;
      performing x-axis deformations, y-axis deformations, and intensity deformations based on differences between the mesh applied to the first images and the second images at the nodes;
      interpolating the deformations to each pixel of the first images;
   inputting third images collected from a new patient to the processor to infer regions for future lesions according to the model and mapping the regions to anatomical regions of the new patient; and
   displaying the regions in a probability map at a display unit to indicate areas of increased likelihood of lesion occurrence.

2. The method of claim 1, wherein the ROIs are compared in the first images to the second images to identify differences between the first and second images, the differences corresponding to the lesions in the second images.

3. The method of claim 1, wherein the model is trained based on classification of the ROIs according to partitions defining K classes of features learned when the first images and the second images are compared, the K classes corresponding to benign, normal, and malignant features.

4. The method of claim 1, further comprising inputting patient data when the model is trained and during inputting of the third images, and wherein the patient data includes one or more of patient history, composition covariates, genomics, proteomics, and measures made on biological samples of a corresponding patient.

5. The method of claim 4, wherein the patient data is quantified by converting the patient data into a numerical format.

6. The method of claim 1, further comprising using one of machine learning and deep learning to build the model.

7. A method for predicting clinical findings, comprising:
   receiving patient images at a processor, the patient images free of clinical findings, wherein the processor is configured with a model trained to predict and localize an appearance of a clinical finding based on comparison of training images, patient data, and ground truth images, wherein the model comprises a machine learning classifier configured to:
      extract features from regions of interest (ROIs) in the patient images;
      compute feature vectors for each ROI, wherein each feature vector corresponds to features computed from the patient images and quantified patient data;

partition an N-dimensional feature space according to K classes, wherein K includes normal, benign, and malignant classes; and classify the ROIs by mapping the feature vectors to locations within the partitioned N-dimensional feature space; and outputting, at a display unit, predicted regions of increased likelihood of future clinical finding appearance from the model as a map displaying the predicted regions relative to anatomical regions of an imaged patient.

8. The method of claim 7, further comprising registering the patient images prior to inputting the patient images to the model, and wherein registering the patient images includes adjusting an orientation of the patient images to match an orientation of a reference image.

9. The method of claim 8, wherein registering the patient images further includes determining a skin line based on the reference image and warping the patient images based on the skin line.

10. The method of claim 9, wherein warping the patient images includes applying a mesh to each of the patient images and displacing nodes of the mesh to deform the patient images to allow skins of the patient images, after warping, to be superimposed on the skin line of the reference image.

11. The method of claim 7, wherein the model is trained using a Deep Neural Network, and wherein the Deep Neural Network is configured to partition the training images and the patient data into K classes and determine a loss function between the K classes of the patient images and the patient data and K classes of the ground truth images.

12. The method of claim 11, wherein the patient images are warped one of prior to inputting the patient images to the model or after the patient images are delivered to the Deep Neural Network.

13. A method for predicting future occurrences of lesions in a patient, comprising:
delivering a first set of images of the patient to a trainable model, the trainable model implemented at a computer processor communicatively coupled to an imaging system, to acquire predicted locations of the future occurrences of the lesions, wherein the trainable model comprises a machine learning classifier configured to:
extract features from regions of interest (ROIs) in the first set of images;
compute feature vectors for each ROI, wherein each feature vector corresponds to features computed from the first set of images and quantified patient data;
partition an N-dimensional feature space according to K classes, wherein K includes normal, benign, and malignant classes; and
classify the ROIs by mapping the feature vectors to locations within the partitioned N-dimensional feature space;
wherein the trainable model outputs a probability map of the future occurrences of the lesions, at a display unit communicatively coupled to the computer processor, in a second set of images of the patient based on one of machine learning or deep learning.

14. The method of claim 13, wherein the first set of images do not show lesions.

15. The method of claim 13, wherein the features computed from the first set of images include time evolution and/or asymmetry of the features amongst the first set of images.

16. The method of claim 13, wherein the probability map highlights locations of the future occurrences of the lesions by one or more of highlighting brightness, color, shape of highlighting, and annotated text.

17. The method of claim 13, wherein feeding the images to the trainable model includes feeding images acquired via different imaging modalities.

* * * * *